(12) United States Patent
Marquard et al.

(10) Patent No.: US 12,586,100 B2
(45) Date of Patent: Mar. 24, 2026

(54) METHODS, SYSTEMS, AND MEDIA FOR INHIBITING THE TRANSMISSION OF MEDIA CONTENT BASED ON FREQUENCY AND EXPOSURE MEASUREMENTS

(71) Applicant: Integral Ad Science, Inc., New York, NY (US)

(72) Inventors: David Joseph Marquard, New York, NY (US); Kiril Tsemekhman, Long Island City, NY (US); Mattia Fumagalli, Brooklyn, NY (US); Igor Benyaminov, Forest Hills, NY (US); Michael Kim, New York, NY (US); Rafael Bagmanov, Brooklyn, NY (US); Ana Calabrese, New York, NY (US)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 18/511,694

(22) Filed: Nov. 16, 2023

(65) Prior Publication Data

US 2024/0086963 A1 Mar. 14, 2024

Related U.S. Application Data

(63) Continuation of application No. 15/973,380, filed on May 7, 2018, now Pat. No. 11,875,378.
(Continued)

(51) Int. Cl.
G06Q 30/0242 (2023.01)
G06Q 30/0241 (2023.01)
(52) U.S. Cl.
CPC ..... *G06Q 30/0246* (2013.01); *G06Q 30/0277* (2013.01)

(58) Field of Classification Search
CPC ...................... G06Q 30/0246; G06Q 30/0277
See application file for complete search history.

(56) References Cited

U.S. PATENT DOCUMENTS 11,451,885 B1 9/2022 Chandrashekar et al.
11,455,661 B2 9/2022 Chud
(Continued)

OTHER PUBLICATIONS

Notice of Allowance dated Apr. 5, 2023 in U.S. Appl. No. 15/973,380, pp. 1-254.
(Continued)

*Primary Examiner* — Alexandru Cirnu
(74) *Attorney, Agent, or Firm* — Byrne Poh LLP

(57) ABSTRACT

Mechanisms for inhibiting the transmission of media content based on frequency and exposure measurements are provided. In some embodiments, the method comprises: receiving consumption information of a plurality of content items associated with a plurality of viewers; determining, from the consumption information, exposure frequency for each viewer of the plurality of viewers, exposure time of a set of content items provided to each viewer of the plurality of viewers, and lift for each viewer of the plurality of viewers, wherein the lift corresponds to a difference of an expected number of treated conversions and an expected number of untreated conversions over a sum of the expected number of treated conversions and the expected number of untreated conversions; determining an optimal exposure frequency and an optimal exposure time based on the exposure frequency, the exposure time, and the lift; generating (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer
(Continued)

of the plurality of viewers; receiving a request for a content item from a user device; determining whether the user device should be assigned with the first user segment, the second user segment, or the third user segment; in response to determining that the user device should be assigned to the first user segment, transmitting the plurality of additional content items until determining that the user device should be assigned to the second user segment based on updated exposure frequency information and updated exposure time information; continuing to transmit the at least one additional content item to the user device while the user device is positioned within the second user segment until determining that the user device should be assigned to the third user segment based on the updated exposure frequency information and the updated exposure time information; and inhibiting the presentation of any additional content items on the user device in response to the user device being positioned within the third user segment.

21 Claims, 15 Drawing Sheets

Related U.S. Application Data

(60) Provisional application No. 62/502,436, filed on May 5, 2017.

(56) References Cited

U.S. PATENT DOCUMENTS

| | | | |
|---|---|---|---|
| 2010/0088714 A1* | 4/2010 | Hawkins | H04H 20/14 |
| | | | 725/14 |
| 2016/0180375 A1* | 6/2016 | Rose | G06Q 30/0244 |
| | | | 705/14.43 |

OTHER PUBLICATIONS

Office Action dated Mar. 4, 2022 in U.S. Appl. No. 15/973,380, pp. 1-66.

Office Action dated Mar. 27, 2020 in U.S. Appl. No. 15/973,380, pp. 1-13.

Office Action dated Apr. 14, 2021 in U.S. Appl. No. 15/973,380, pp. 1-31.

Office Action dated Oct. 3, 2022 in U.S. Appl. No. 15/973,380, pp. 1-127.

Office Action dated Oct. 8, 2020 in U.S. Appl. No. 15/973,380, pp. 1-24.

Office Action dated Oct. 22, 2021 in U.S. Appl. No. 15/973,380, pp. 1-13.

Office Action dated Dec. 20, 2019 in U.S. Appl. No. 15/973,380, pp. 1-15.

* cited by examiner

200

METHODS, SYSTEMS, AND MEDIA FOR INHIBITING THE TRANSMISSION OF MEDIA CONTENT BASED ON FREQUENCY AND EXPOSURE MEASUREMENTS

CROSS-REFERENCE TO RELATED APPLICATIONS

This application is a continuation of U.S. patent application Ser. No. 15/973,380, filed May 7, 2018, which claims the benefit of U.S. Provisional Patent Application No. 62/502,436, filed May 5, 2017, each of which is hereby incorporated by reference herein in its entirety.

TECHNICAL FIELD

The disclosed subject matter relates to methods, systems, and media for inhibiting the transmission of media content based on frequency and exposure measurements.

BACKGROUND

The effectiveness of an online advertising campaign can be measured using various techniques. One technique includes measuring the conversion rate of the advertising campaign as a way of estimating whether the advertisements are effective at driving consumer behavior. A campaign conversion can generally be defined as a consumer being presented with an advertisement and then taking a particular action. Examples of actions that can be considered a campaign conversion include engagement with or clicking on the advertisement, accessing and/or browsing a web site of the advertiser, downloading and/or purchasing a product sold or provided by the advertiser, signing up for a subscription from the advertiser, providing information to be added to an advertiser's mailing list, etc.

As part of an online advertising campaign, an advertiser can use various advertising channels for delivering advertisements to consumers. For example, an advertiser can contact content publishers (e.g., news web sites, blogs, social networking websites, etc.) directly to arrange for advertisements associated with an advertising campaign to be presented to consumers (e.g., a direct publisher channel). In other examples, an advertiser can use programmatic advertising channels to buy and/or place advertisements. For example, an advertiser can contact a marketer who can arrange for advertisements to be shown on various web pages and/or arrange for advertisements to be placed in advertisement placements on one or more web sites through one or more real-time bidding exchanges. As another example of programmatic buying, an advertiser can contact a demand side platform that can arrange for advertisements to be placed in advertisement placements on one or more web sites through one or more real-time bidding exchanges. As yet another example of programmatic buying, an advertiser can use a real-time bidding exchange directly to bid on the opportunity to place advertisements.

When advertisements are delivered to consumers using these advertising channels, one or more targeting parameters can be used to target specific types of consumers. For example, advertisements can be delivered to specific consumers who fall into various demographic groups or psychographic groups. In another example, advertisements can be delivered to consumers that have visited specific types of web sites, consumers that are located in certain geographic areas, etc.

Attribution of conversion actions can be performed (or measured) to determine which of the advertising channels to attribute a conversion action to. For example, when a conversion action is performed, it can be matched with one or more advertisements from one or more particular advertising channels that were presented to the consumer that performed the conversion action. A conversion rate for each particular advertising channel can be determined by comparing the number of conversions attributable to that advertising channel and the total number of advertisements presented through that advertising channel.

In conducting an advertising campaign, advertisers can use multiple channels for delivering advertisements, including multiple partners within the same type of channel (e.g., multiple marketers, multiple demand-side platforms, multiple direct publishing partners, etc.). When multiple channels are being used to deliver advertisements to consumers, conversion rates calculated for the various channels, along with the cost of advertising via those channels can be used to determine a return on investment of advertising. For example, one channel may be low cost but also have a low conversion rate, while another may be higher cost and also have a higher conversion rate. Using a measurement such as return on investment ("ROI"), an advertiser can attempt to determine the cost effectiveness of different channels despite the channels having different cost structures.

Even given these current techniques, measuring the effectiveness of an online advertising campaign is problematic. For example, in a typical advertising campaign, it has been seen that about sixty percent to eighty percent of content consumers are each served one or two advertisement impressions and about seventy percent to eighty-five percent of content consumers are each served no more than one viewable advertisement impression. In addition, of those seventy to eighty-five percent of content consumers that are each served no more than one viewable advertisement impression, it has been seen that only fifty to sixty-five percent of those content consumers are each exposed to the advertisements for a total of five seconds or less. Because of this, advertisers and digital marketers tend to either underexpose or overexpose their audiences.

Accordingly, it is desirable to provide methods, systems, and media for inhibiting the transmission of media content based on frequency and exposure measurements.

SUMMARY

In accordance with some embodiments of the disclosed subject matter, mechanisms for inhibiting the transmission of media content based on frequency and exposure measurements are provided.

In accordance with some embodiments of the disclosed subject matter, a method for presenting content is provided, the method comprising: receiving, using a hardware processor of a server device, consumption information of a plurality of content items associated with a plurality of viewers; determining, using the hardware processor, from the consumption information, exposure frequency for each viewer of the plurality of viewers, exposure time of a set of content items provided to each viewer of the plurality of viewers, and lift for each viewer of the plurality of viewers, wherein the lift corresponds to a difference of an expected number of treated conversions and an expected number of untreated conversions over a sum of the expected number of treated conversions and the expected number of untreated conversions; determining, using the hardware processor, an optimal exposure frequency and an optimal exposure time based on the exposure frequency, the exposure time, and the lift; generating, using the hardware processor, (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers; receiving, using the hardware processor, a request for a content item from a user device; determining, using the hardware processor, whether the user device should be assigned with the first user segment, the second user segment, or the third user segment; in response to determining that the user device should be assigned to the first user segment, transmitting, using the hardware processor, the plurality of additional content items until determining that the user device should be assigned to the second user segment based on updated exposure frequency information and updated exposure time information; continuing, using the hardware processor, to transmit the at least one additional content item to the user device while the user device is positioned within the second user segment until determining that the user device should be assigned to the third user segment based on the updated exposure frequency information and the updated exposure time information; and inhibiting, using the hardware processor, the presentation of any additional content items on the user device in response to the user device being positioned within the third user segment.

In some embodiments, the method further comprises generating a frequency-exposure graphical representation, wherein each portion of the frequency-exposure graphical representation is assigned a color code associated with a lift measurement corresponding to a combination of a particular exposure frequency and a particular exposure time.

In some embodiments, the optimal exposure frequency and the optimal exposure time are determined based on the color code associated with the lift measurement.

In some embodiments, each of the first user segment, the second user segment, and the third user segment is assigned to a region of the frequency-exposure graphical representation, wherein the region is a two-dimensional area within the frequency-exposure graphical representation.

In some embodiments, inhibiting the presentation of any additional content items on the user device in response to the user device being positioned within the third user segment further comprises transmitting a drop instruction to the user device in response to the request for the content item.

In some embodiments, inhibiting the presentation of any additional content items on the user device in response to the user device being positioned within the third user segment further comprises determining whether to transmit a notification to devices associated with the content item being requested.

In accordance with some embodiments of the disclosed subject matter, a system for presenting content is provided, the system comprising a memory and a hardware processor that, when executing computer executable instructions stored in the memory, is configured to: receive consumption information of a plurality of content items associated with a plurality of viewers; determine, from the consumption information, exposure frequency for each viewer of the plurality of viewers, exposure time of a set of content items provided to each viewer of the plurality of viewers, and lift for each viewer of the plurality of viewers, wherein the lift corresponds to a difference of an expected number of treated conversions and an expected number of untreated conversions over a sum of the expected number of treated conversions and the expected number of untreated conversions; determine an optimal exposure frequency and an optimal exposure time based on the exposure frequency, the exposure time, and the lift; generate (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers; receive a request for a content item from a user device; determine whether the user device should be assigned with the first user segment, the second user segment, or the third user segment; in response to determining that the user device should be assigned to the first user segment, transmit the plurality of additional content items until determining that the user device should be assigned to the second user segment based on updated exposure frequency information and updated exposure time information; continue to transmit the at least one additional content item to the user device while the user device is positioned within the second user segment until determining that the user device should be assigned to the third user segment based on the updated exposure frequency information and the updated exposure time information; and inhibit the presentation of any additional content items on the user device in response to the user device being positioned within the third user segment.

In accordance with some embodiments of the disclosed subject matter, a non-transitory computer-readable medium containing computer-executable instructions that, when executed by a hardware processor, cause the hardware processor to perform a method for presenting content is provided, the method comprising: receiving consumption information of a plurality of content items associated with a plurality of viewers; determining, from the consumption information, exposure frequency for each viewer of the plurality of viewers, exposure time of a set of content items provided to each viewer of the plurality of viewers, and lift for each viewer of the plurality of viewers, wherein the lift corresponds to a difference of an expected number of treated conversions and an expected number of untreated conversions over a sum of the expected number of treated conversions and the expected number of untreated conversions; determining an optimal exposure frequency and an optimal exposure time based on the exposure frequency, the exposure time, and the lift; generate (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers; receiving a request for a content item from a user device; determining whether the user device should be assigned with the first user segment, the second user segment, or the third user segment; in response to determining that the user device should be assigned to the first user segment, transmitting the plurality of additional content items until determining that the user device should be assigned to the second user segment based on updated exposure frequency information and updated exposure time information; continuing to transmit the at least one additional content item to the user device while the user device is positioned within the second user segment until determining that the user device should be assigned to the third user segment based on the updated exposure frequency information and the updated exposure time information; and inhibiting the presentation of any additional content items on the user device in response to the user device being positioned within the third user segment.

In accordance with some embodiments of the disclosed subject matter, a system for presenting content is provided, the system comprising: means for receiving consumption information of a plurality of content items associated with a plurality of viewers; means for determining, from the consumption information, exposure frequency for each viewer of the plurality of viewers, exposure time of a set of content items provided to each viewer of the plurality of viewers, and lift for each viewer of the plurality of viewers, wherein the lift corresponds to a difference of an expected number of treated conversions and an expected number of untreated conversions over a sum of the expected number of treated conversions and the expected number of untreated conversions; means for determining an optimal exposure frequency and an optimal exposure time based on the exposure frequency, the exposure time, and the lift; means for generating (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers; means for receiving a request for a content item from a user device; means for determining whether the user device should be assigned with the first user segment, the second user segment, or the third user segment; in response to determining that the user device should be assigned to the first user segment, means for transmitting the plurality of additional content items until determining that the user device should be assigned to the second user segment based on updated exposure frequency information and updated exposure time information; means for continuing to transmit the at least one additional content item to the user device while the user device is positioned within the second user segment until determining that the user device should be assigned to the third user segment based on the updated exposure frequency information and the updated exposure time information; and means for inhibiting the presentation of any additional content items on the user device in response to the user device being positioned within the third user segment.

DETAILED DESCRIPTION

Figure 1:
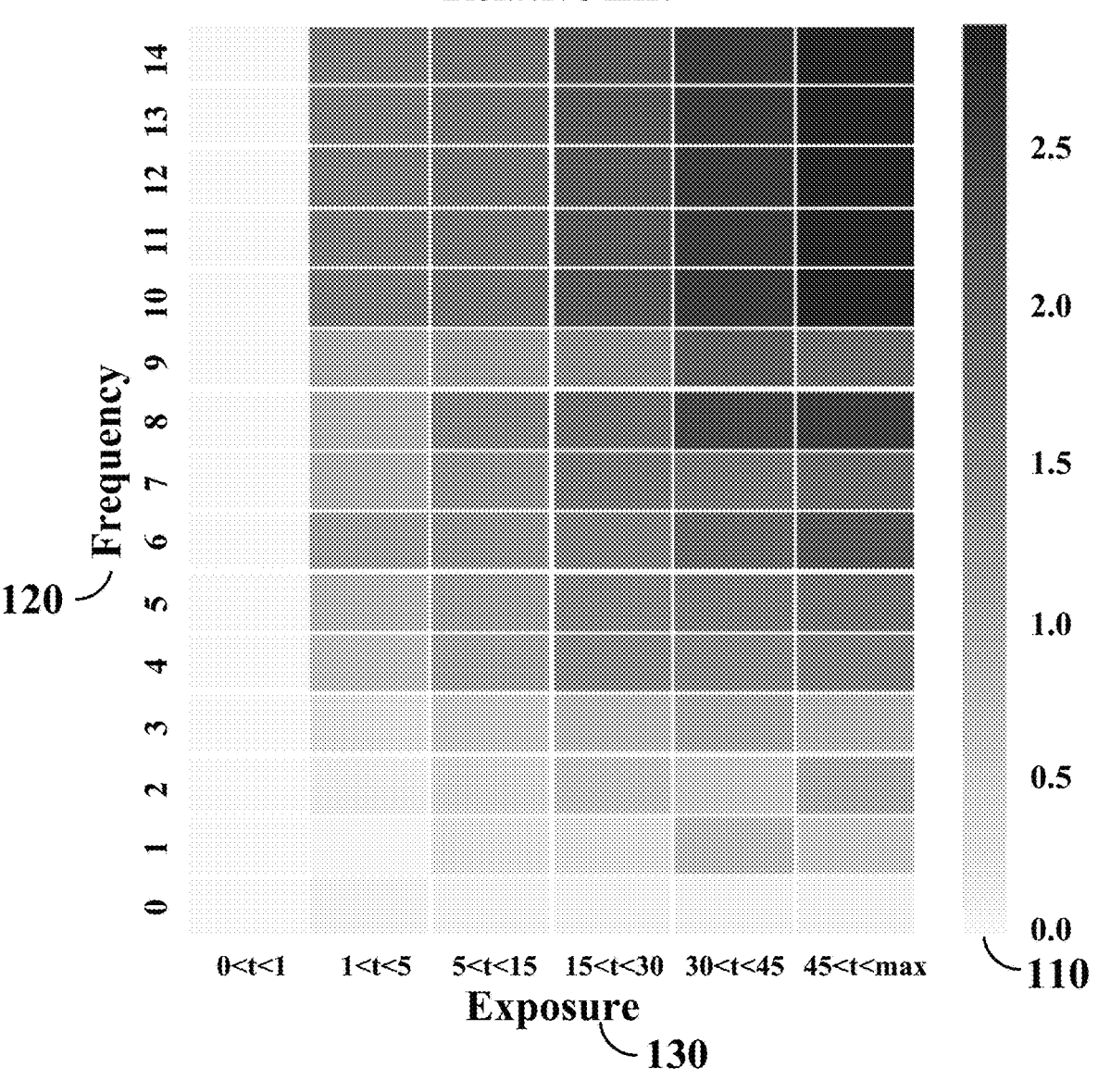
FIG. 1 is an illustrative example of a plot representation that is generated to show how lift can be dependent upon exposure frequency and/or exposure time in accordance with some embodiments of the disclosed subject matter.

Mechanisms for inhibiting the transmission of media content based on frequency and exposure measurements are provided.

Generally speaking, the mechanisms described herein relate to modifying the transmission of media content to content consumers based on a determination of exposure frequency and/or a determination of exposure time. It should be noted that "exposure frequency" as used herein generally refers to a count of the number of impressions (including both viewable impressions and unviewable impressions) served per user and that "exposure time" as used herein generally refers to a sum of the total amount of time that all of a given set of impressions served to a given user has been in view (imp_ivt). It should also be noted that "lift" as used herein generally refers to the difference of the expected number of treated conversions and the expected number of untreated conversions over the expected number of treated conversions and the expected number of untreated conversions.

It should further be noted that, in some embodiments, exposure frequency and exposure time for a particular content consumer can be determined across all of the device associated with that content consumer. For example, based on user account information, user authentication information, and/or device identification information, the mechanisms can calculate exposure frequency and/or exposure time for the content consumer across multiple devices to determine whether media content, such as an additional advertisement impression, should be transmitted to the content consumer on one of the devices.

For example, in response to receiving consumer transactions associated with a content consumer that is consuming media content items from a content creator or a content provider and determining optimal exposure frequency and/or optimal exposure time from the consumer transactions, the mechanisms can determine an exposure profile from multiple exposure profiles for the content consumer and determine whether to (1) transmit additional media content items for consumption by the content consumer at a computing device (sometimes referred to as "an underexposed profile"), (2) increase impression purchases for the content consumer at the computing device (e.g., to drive the content consumer into a profile having an improved lift) (sometimes referred to as "a target zone profile"), (3) take no further action in connection with the content consumer as lift has been optimized (sometimes referred to as "an ideal zone profile," and/or (4) take no further action in connection with the content consumer as it is determined there is no added benefit in providing additional impressions (sometimes referred to as "an overexposed profile").

It should be noted that the mechanisms used herein can include any suitable number of profiles. For example, a particular profile and corresponding action can be inputted using an advertiser device. In another example, using machine learning, a particular subset of profiles can be selected from a group of profiles based on the consumer transaction information, such as campaign impression information and viewability information.

In a more particular example, FIG. 1 shows an illustrative example of a plot 100 showing how lift can be dependent upon exposure frequency and/or exposure time. Moreover, the highest amount of lift (as shown by the darker shaded portions of lift bar 110, where a lighter shade is equivalent to a lower lift and a darker shade is equivalent to a higher lift) can be obtained by a combination of high exposure frequency 120 (e.g., a frequency of 10 content items or more) and long exposure time 130 (e.g., an exposure time of 45 seconds or more). Such a plot can be generated from historical viewability information associated with a content consumer (e.g., as opposed to viewability information associated with a page or a site) and, using machine learning techniques, an optimal exposure frequency and/or an optimal exposure time can be determined to achieve a desired amount or level of lift.

In continuing this example, in response to determining the exposure profile associated with a content consumer, the mechanisms can determine whether to continue presenting media content, such as advertisement impressions from a particular advertising channel or media source, to the content consumer or to inhibit such media content from being purchased and/or presented. For example, the mechanisms can determine that a content consumer has exceeded a saturation point in the lift plot shown in FIG. 1 such that additional impressions are unlikely to produce additional lift and, in response to that determination, additional impressions from a particular source (e.g., a particular advertisement channel) are to be inhibited from being transmitted to a device associated with the content consumer. In another example, the mechanisms can determine that a content consumer has not yet reached a desired amount or level of lift and that additional impressions are likely to substantially improve lift and, in response to that determination, the mechanisms can purchase impressions for the content consumer to achieve the desired amount or level of lift. Illustrative examples of frequency-exposure plots that can be generated are shown in FIGS. 2 and 3.

Figure 2:
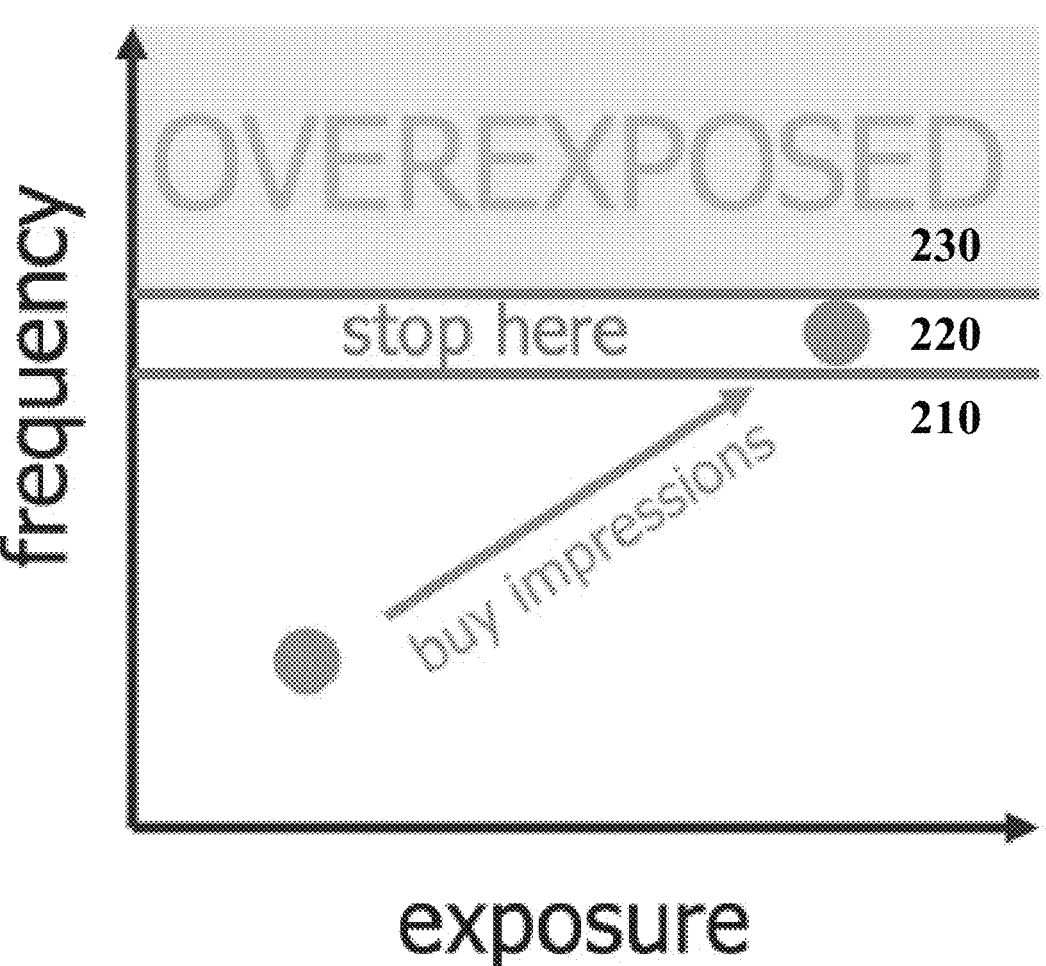
FIG. 2 is an illustrative example of a frequency-exposure plot showing multiple regions that indicate whether additional impressions should be transmitted to a user device in accordance with some embodiments of the disclosed subject matter.
Figure 3:
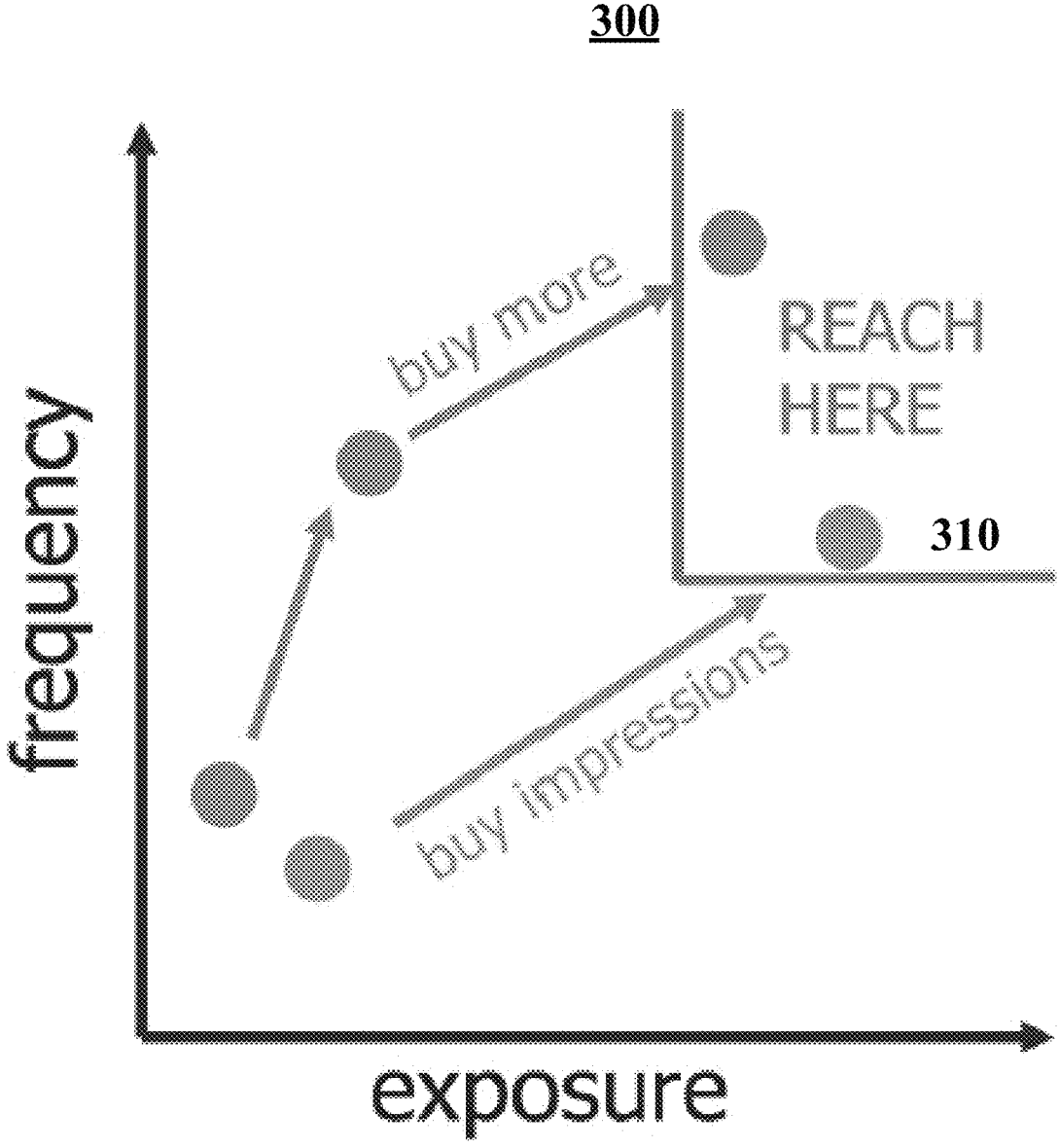
FIG. 3 is an illustrative example of a frequency-exposure plot showing a region of a particular shape and/or dimension that indicates whether additional impressions should be transmitted to a user device in accordance with some embodiments of the disclosed subject matter.

For example, as shown in FIG. 2, the mechanisms can convert plot 100 to a frequency-exposure plot 200 that indicates where impressions should be inhibited. In a more particular example, the mechanisms can generate regions 210, 220, and 230 to indicate an underexposed region 210 in which additional impressions should be purchased and transmitted, an ideal region 220 in which no further impressions should be purchased and/or transmitted, and an overexposed region 230 in which no further impressions should be purchased and/or transmitted and in which a content provider should be inhibited from purchasing and/or transmitting additional impressions. In continuing this example, in response to receiving an advertisement request from a browser application executing on a user device (e.g., that was intercepted by a firewall system), the mechanisms can determine whether the user device is associated with one of regions 210, 220, and 230 to automatically determine whether a content provider should present an impression to the user device.

It should be noted that, in some embodiments, regions can be any suitable shape of any suitable dimensions. For example, as shown in FIG. 3, the mechanisms can convert plot 100 to a frequency-exposure plot 300 that indicates an ideal region 310 of a particular shape and/or dimensions. In continuing this example, in response to receiving an advertisement request from a browser application executing on a user device (e.g., that was intercepted by a firewall system), the mechanisms can determine that impressions should continue being purchased and/or presented on the user device until region 310 has been reached.

In some embodiments, the mechanisms can determine a threshold exposure frequency value. Referring back to FIG. 1, the mechanisms can analyze the plot shown in FIG. 1 to determine that an optimal lift is achieved at an exposure frequency of ten impressions and that a saturation point has been reached where additional impressions over ten impressions is unlikely to increase lift greater than a given amount. For example, the mechanisms can assign a particular RGB color code or HEX color code to each calculated lift and the mechanisms can select an optimal lift based on exposure frequency corresponding to a particular color code being reached. Accordingly, the mechanisms can continue to present media content from a particular media source, such as impressions associated with an advertisement channel, on a device associated with a user until the threshold exposure frequency value has been reached. For example, the mechanisms can set an impression counter that increments as additional impressions are transmitted to the device until the impression counter reaches a threshold exposure frequency value. It should be noted that, in response to increasing exposure frequency by purchasing impressions for the content consumer to improve lift, exposure time is also increased.

In some embodiments, the mechanisms can determine a threshold exposure frequency value and a threshold exposure time value such that media content is continued to be presented from a particular media source until that content consumer has reached the threshold frequency value and the threshold exposure time. For example, referring back to FIG. 1, the mechanisms can analyze the plot shown in FIG. 1 to determine that an optimal lift is achieved at an exposure frequency of at least ten impressions and an exposure time of at least thirty seconds. In a more particular example, the mechanisms can assign a particular RGB color code or HEX color code to each calculated lift and the mechanisms can determine, based on the assigned color codes, select a threshold frequency value and a threshold exposure time to reach an optimal lift. Accordingly, in continuing this example, the mechanisms can continue to purchase impressions for the content consumer until at least ten impressions have been presented and until the impressions have been in view for at least thirty seconds.

In some embodiments, the mechanisms can use heatmaps in determining threshold frequency values and threshold exposure times.

Figure 4:
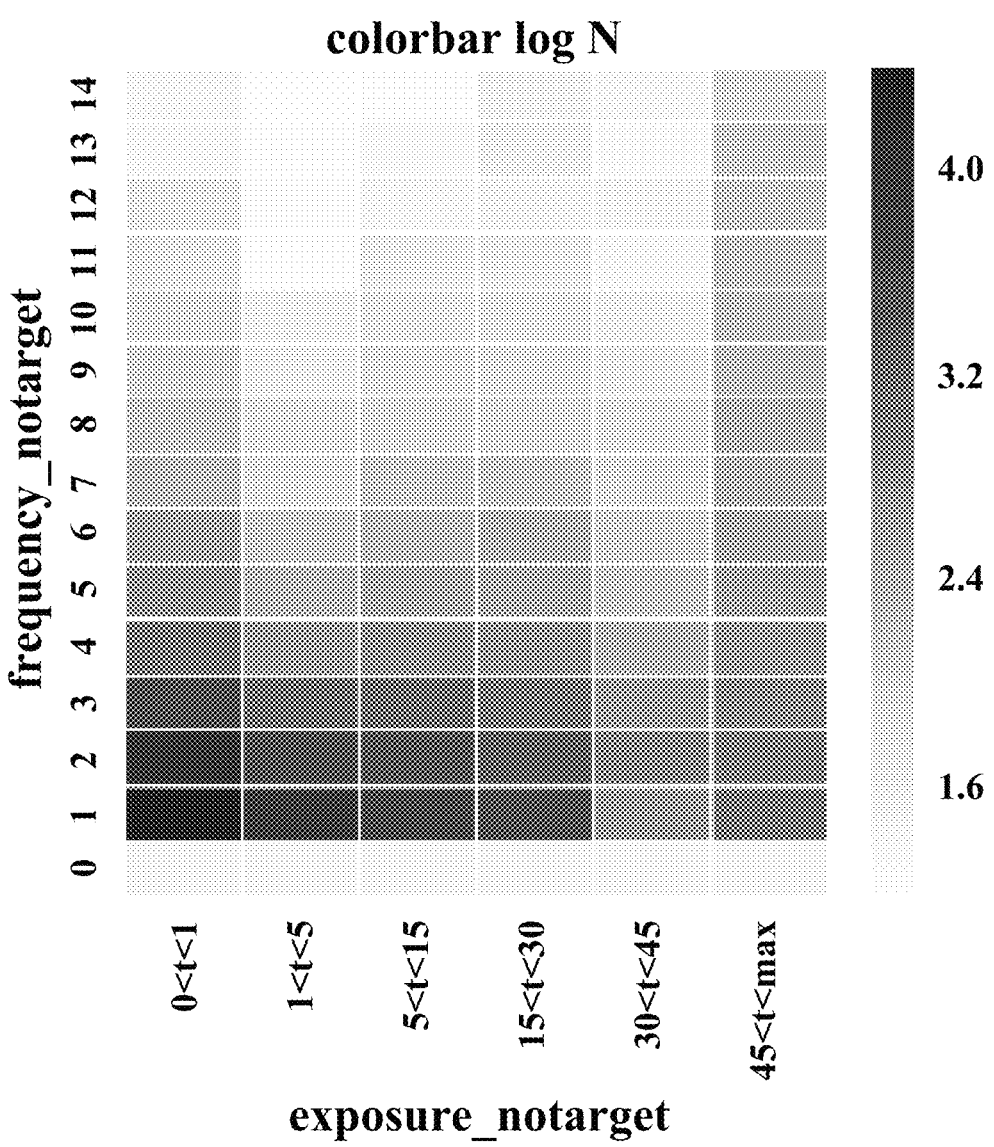
FIG. 4 is an illustrative heatmap that shows a distribution of observed users in bins of frequency and exposure in accordance with some embodiments of the disclosed subject matter.
Figure 5:
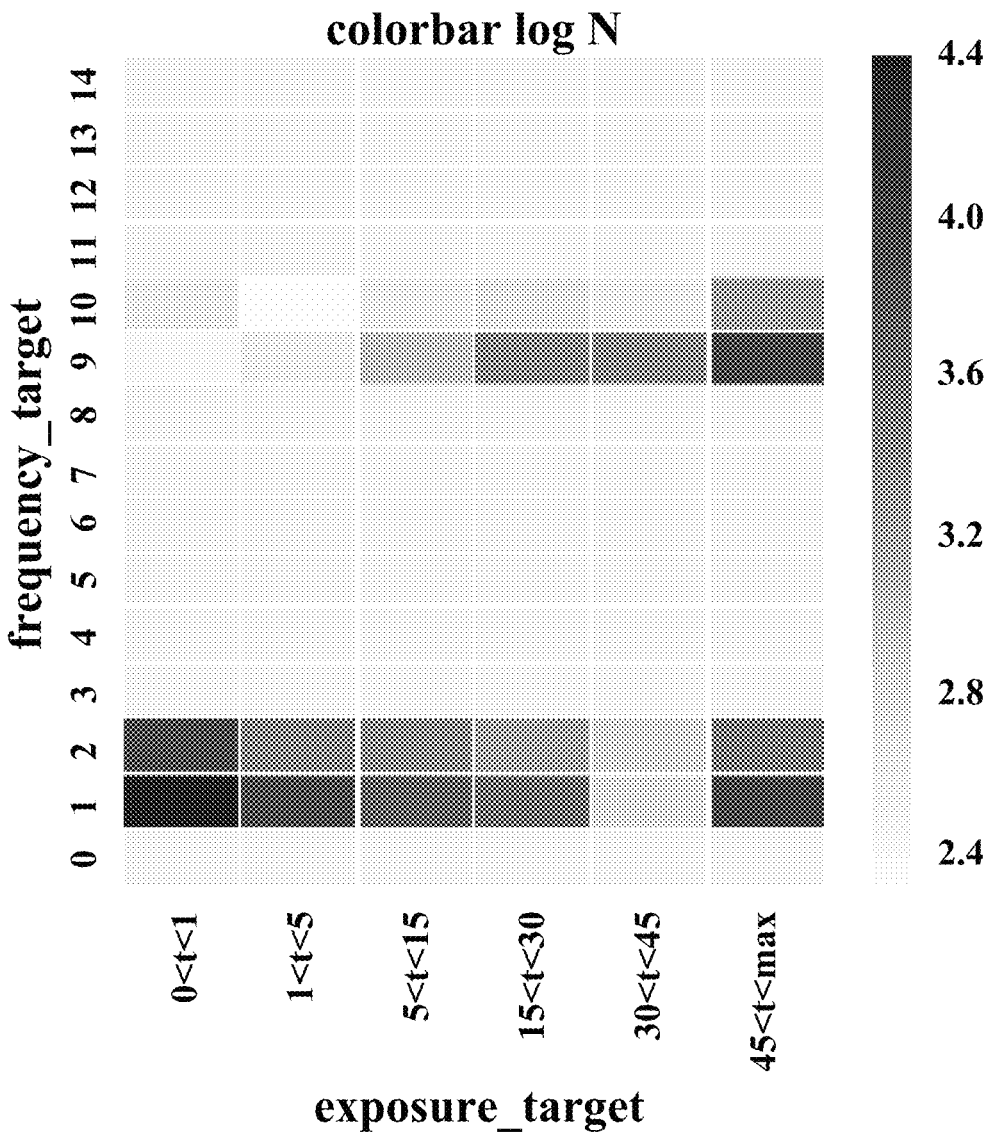
FIG. 5 is an illustrative heatmap that shows a distribution of simulated users using the mechanisms described herein to implement a threshold exposure frequency value in accordance with some embodiments of the disclosed subject matter.

FIG. 4 is an illustrative heatmap 400 that shows a distribution of observed users in bins of frequency and exposure, while FIG. 5 is an illustrative heatmap 500 that shows a distribution of simulated users using the mechanisms described herein to implement a threshold exposure frequency value in accordance with some embodiments of the disclosed subject matter. Note that a darker shade or a darker color code in FIGS. 4 and 5 denotes a higher lift value. In particular, the heatmap 500 of FIG. 5 shows that the simulated users have moved towards portions of the heatmap where the lift is higher than that shown in FIG. 4. It should also be noted that, in the heatmap 500 of FIG. 5, there are no users in which the exposure frequency is determined to be in an overexposed state. That is, using the mechanisms described herein, none of the simulated users would be placed in an overexposed profile. This can, for example, optimize lift for a particular content consumer while controlling the placement of media content (e.g., thereby reducing wasted bandwidth, wasted memory resources, wasted resources spent on that content consumer, etc.).

In some embodiments, in response to receiving an advertisement request from a browser application executing on a user device (e.g., that was intercepted by a firewall system), the mechanisms can generate a heatmap of representative users, generate a heatmap of simulated users, and compare the heatmap of simulated users to the heatmap of representative users to determine lift for the user device while controlling the placement of media content.

Figure 6:
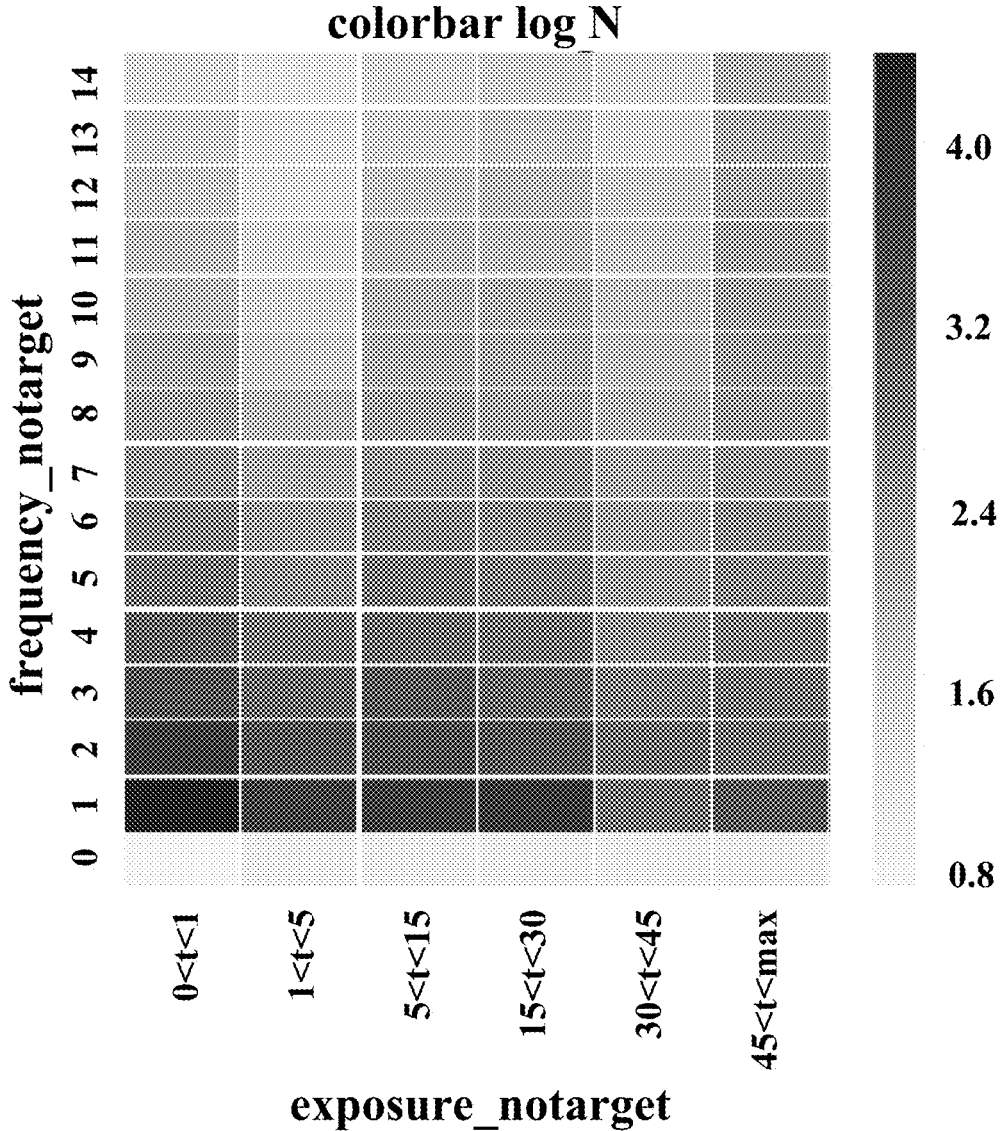
FIG. 6 is an illustrative heatmap that shows a distribution of observed users in bins of frequency and exposure in accordance with some embodiments of the disclosed subject matter.
Figure 7:
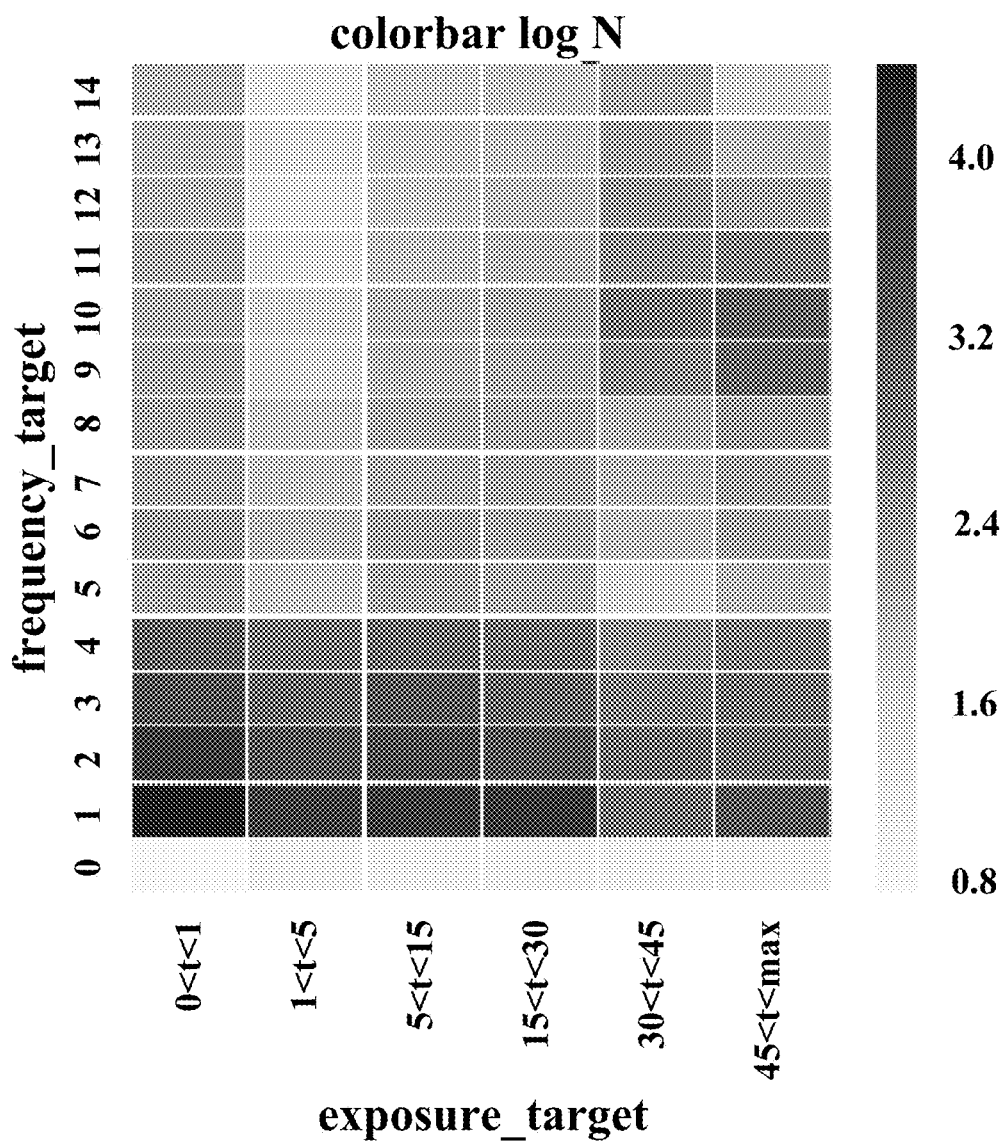
FIG. 7 is an illustrative heatmap that shows a distribution of simulated users using the mechanisms described herein to implement a threshold exposure frequency value and a threshold exposure time value in accordance with some embodiments of the disclosed subject matter.

FIG. 6 is an illustrative heatmap 600 that shows a distribution of observed users in bins of frequency and exposure, while FIG. 7 is an illustrative heatmap 700 that shows a distribution of simulated users using the mechanisms described herein to implement a threshold exposure frequency value and a threshold exposure time value in accordance with some embodiments of the disclosed subject matter. For example, the heatmaps 600 and 700 in FIGS. 6 and 7 illustrate where content consumers continue to receive impressions even if more than a threshold exposure frequency value of ten impressions has been reached as the threshold exposure time value of thirty seconds has not yet been reached. In particular, in comparison with the heatmap 600 of FIG. 6, the illustrative heatmap 700 of FIG. 7 shows that the simulated users have moved towards portions of the heatmap where lift is higher than that shown in FIG. 6.

Figure 8:
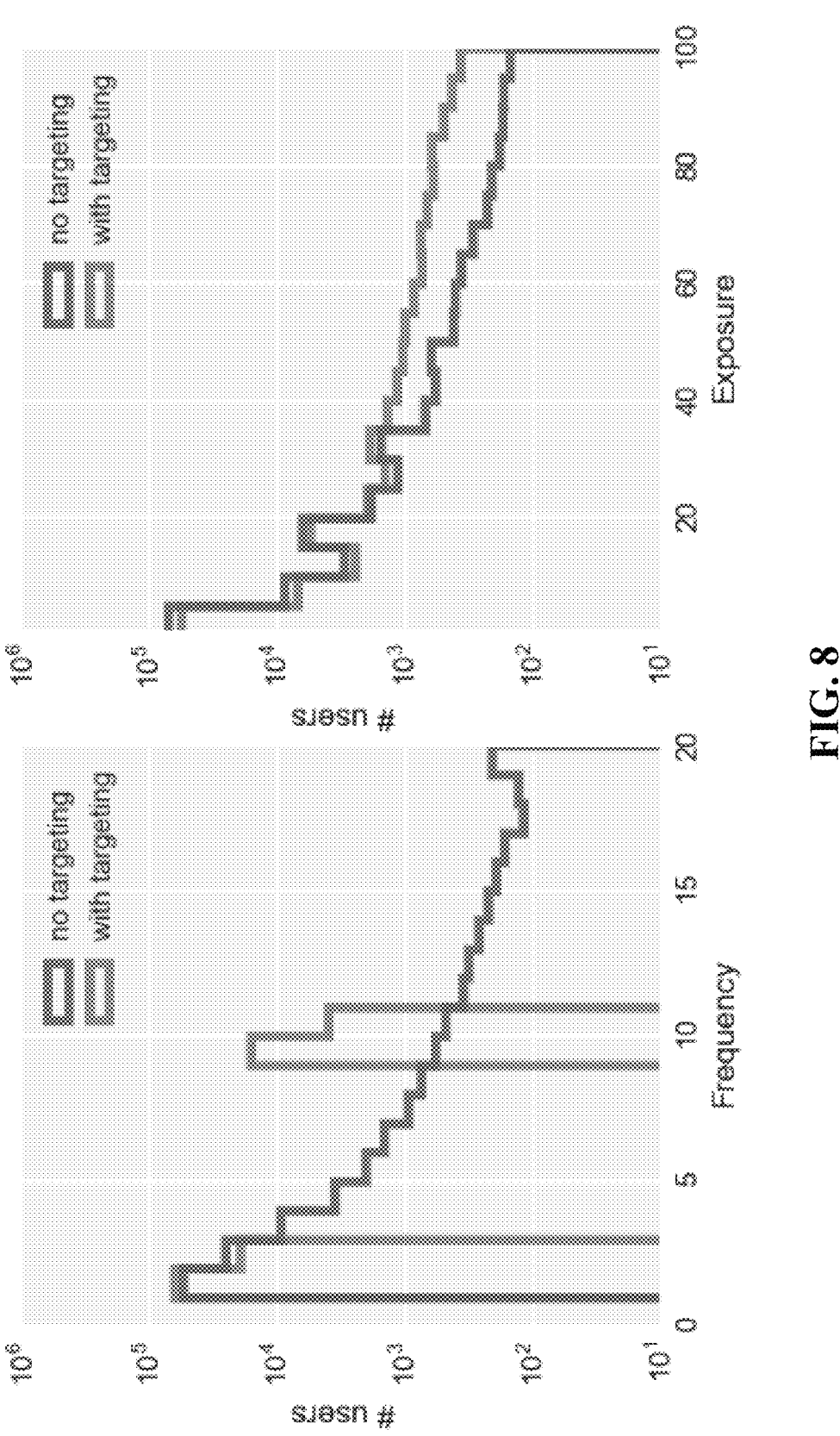
FIG. 8 is an illustrative output distribution of advertisement tags or cookies against exposure frequency (in the left distribution) and exposure time (in the right distribution) in accordance with some embodiments of the disclosed subject matter.

FIG. 8 is an illustrative output distribution of advertisement tags or cookies against exposure frequency (in the left distribution) and exposure time (in the right distribution) in accordance with some embodiments of the disclosed subject matter. As shown in FIG. 8, using the mechanisms described herein, content consumers can be positioned in improved exposure profiles (e.g., ideal frequency bins).

Figure 9:
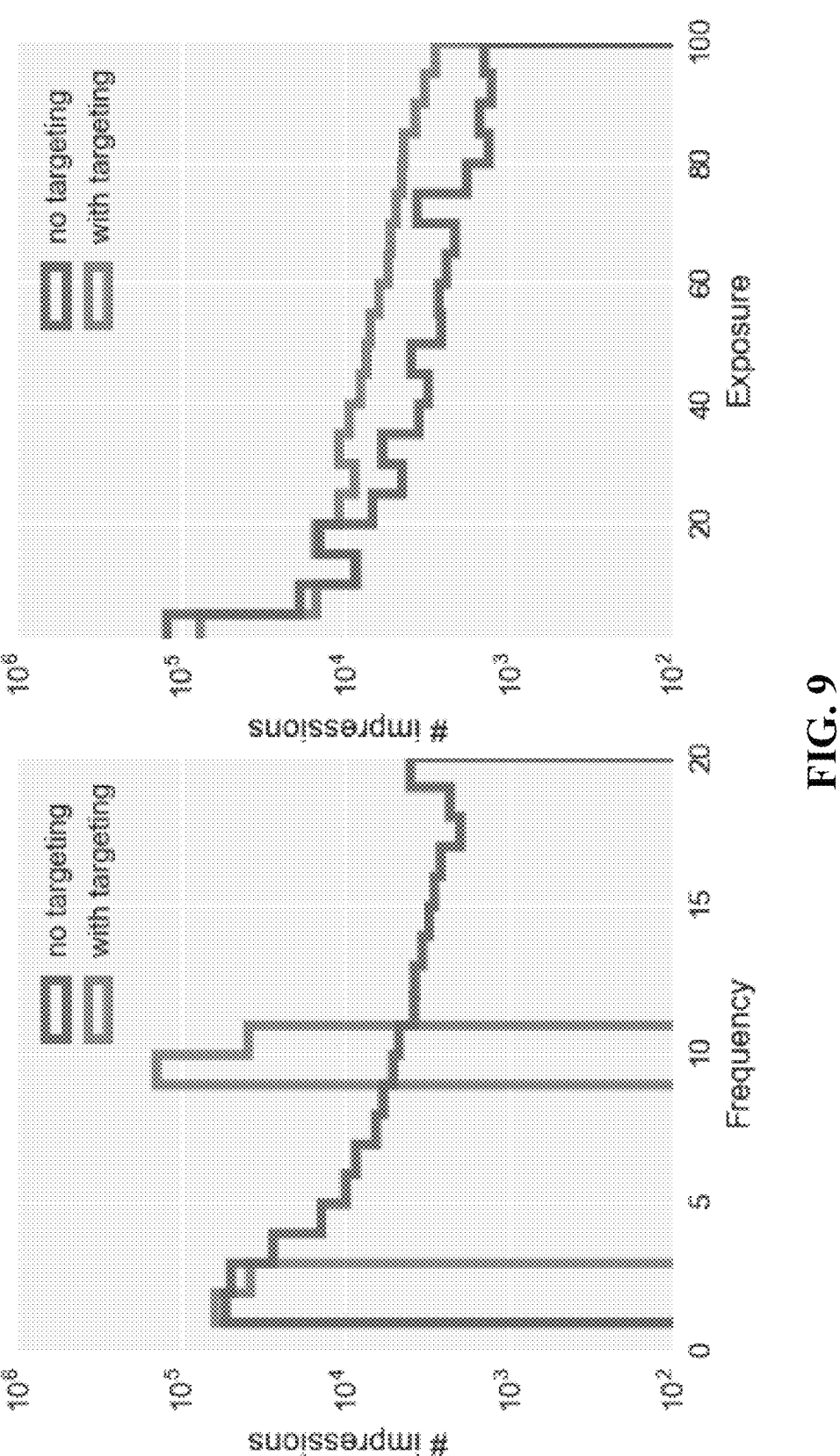
FIG. 9 is an illustrative output distribution of the number of served impressions to content consumers against exposure frequency (in the left distribution) and exposure time (in the right distribution) in accordance with some embodiments of the disclosed subject matter.

FIG. 9 is an illustrative output distribution of the number of served impressions to content consumers against exposure frequency (in the left distribution) and exposure time (in the right distribution) in accordance with some embodiments of the disclosed subject matter. As shown in FIG. 9, using the mechanisms described herein, an improved resource spent can be obtained.

It should be noted that the mechanisms described herein can generate a distribution score associated with a content consumer. For example, a distribution score can be calculated based on the quality of a distribution of users in exposure frequency and/or exposure time and the distribution score for a content consumer can be transmitted to an advertising entity when determine whether to purchase additional impressions for that content consumer.

Figure 10:
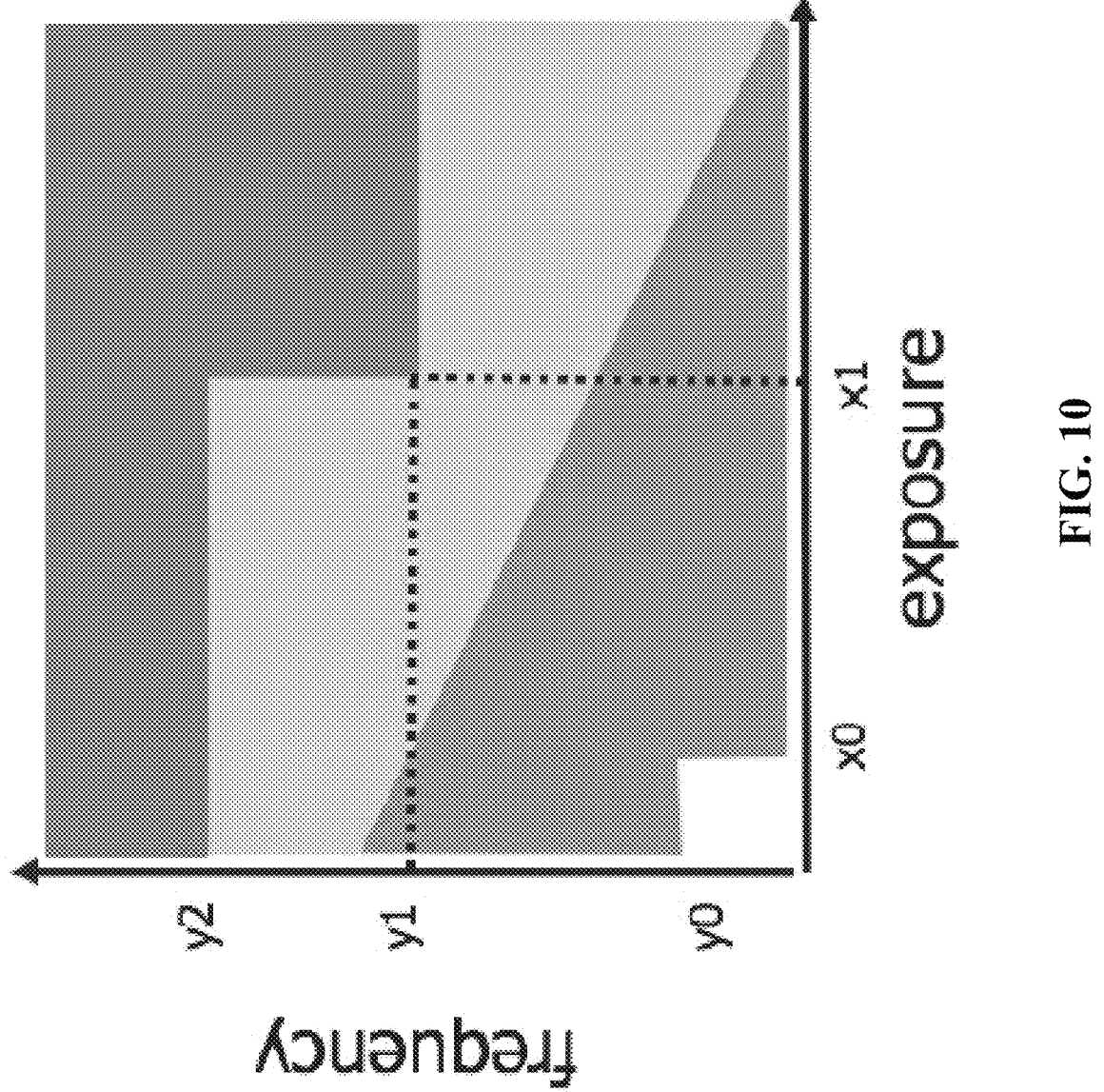
FIG. 10 is an illustrative plot of frequency versus exposure for a particular content consumer that can be generated based on viewability information in accordance with some embodiments of the disclosed subject matter.

For example, as shown in FIG. 10, an illustrative plot of frequency versus exposure for a particular content consumer can be generated based on viewability information in accordance with some embodiments of the disclosed subject matter. In continuing this example, the mechanisms can determine three segments—e.g., 1) an exclusion segment in which an exposure frequency greater than a threshold exposure frequency value and an exposure time greater than a threshold exposure time has been detected in which additional impressions for an advertisement tag associated with this content consumer are not to be purchased and/or transmitted; 2) a target heavily segment in which additional impressions are predicted to substantially improve lift; and 3) a start targeting segment.

In continuing this example, user segment information or a user segment score associated with a particular content consumer can be generated based on the identified segments. In addition, the user segment information or user segment score, current exposure frequency, current exposure time, and other measurements can be updated for the content consumer at any suitable interval (e.g., every minute, every five minutes, every ten minutes, etc.).

It should be noted that, in some embodiments, multiple threshold values can be used. For example, the exclusion segment can determine that an advertisement tag associated with a content consumer should be placed in the exclusion segment in response to determining that either 1) an exposure frequency greater than a first threshold exposure frequency value (e.g., nine impressions) and an exposure time greater than a threshold exposure time (e.g., thirty seconds) has been detected, or 2) an exposure frequency greater than a second threshold exposure frequency value (e.g., fourteen impressions) has been detected.

These mechanisms can be used in a variety of applications. For example, these mechanisms can optimize exposure frequency and exposure time associated with a content consumer to drive causal lift in brand affinity and/or conversions for a particular campaign. In another example, these mechanisms can transmit such exposure frequency-based and exposure time-based determinations associated with a content consumer (and the advertisement tag associated with that content consumer) to a demand side platform or any other suitable entity that determines whether to purchase advertisement impressions for the content consumer.

Figure 11:
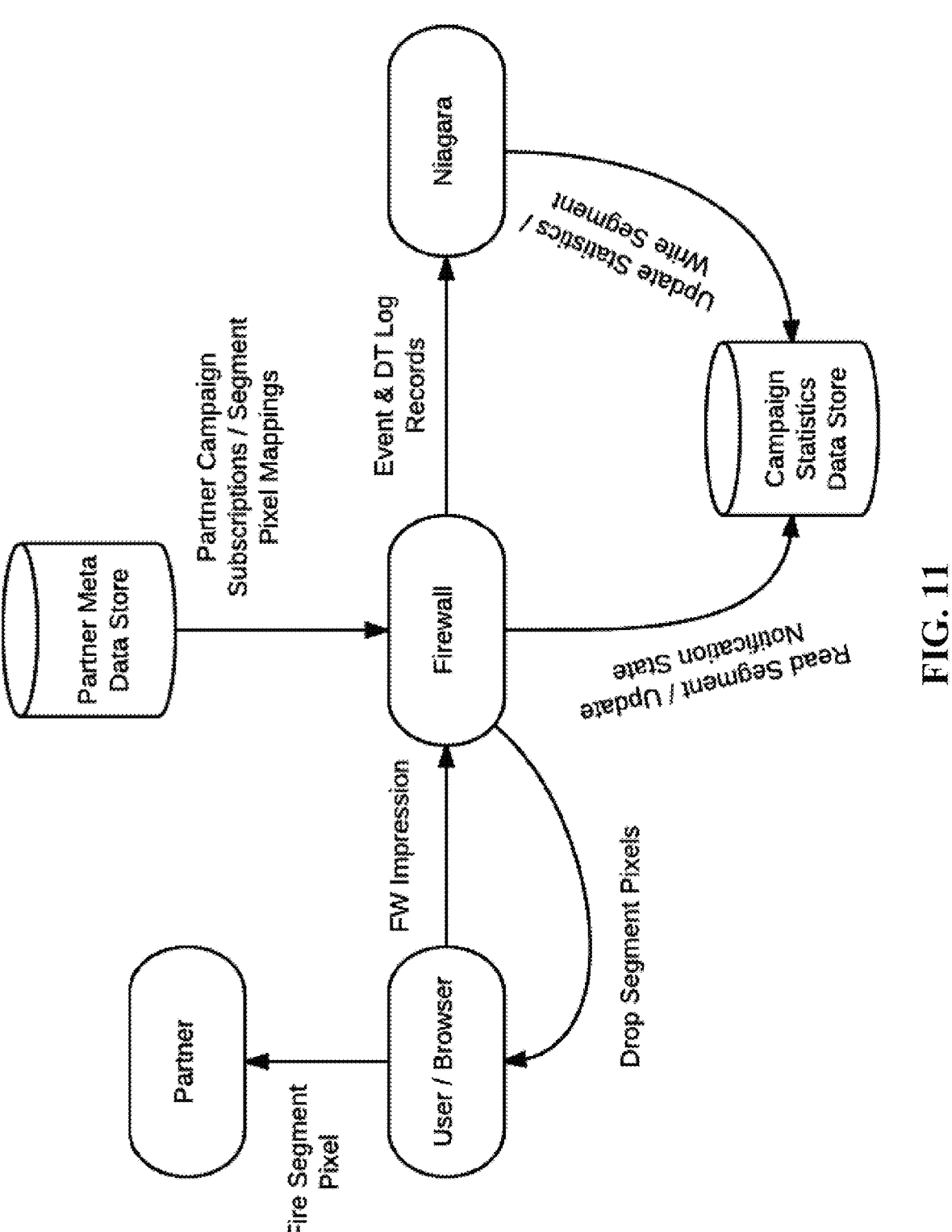
FIG. 11 shows a general schematic diagram that illustrates the interactions between various system components to determine whether to continue transmitting media content, such as advertisement impressions, to the content consumer in accordance with some embodiments of the disclosed subject matter.
Figure 12:
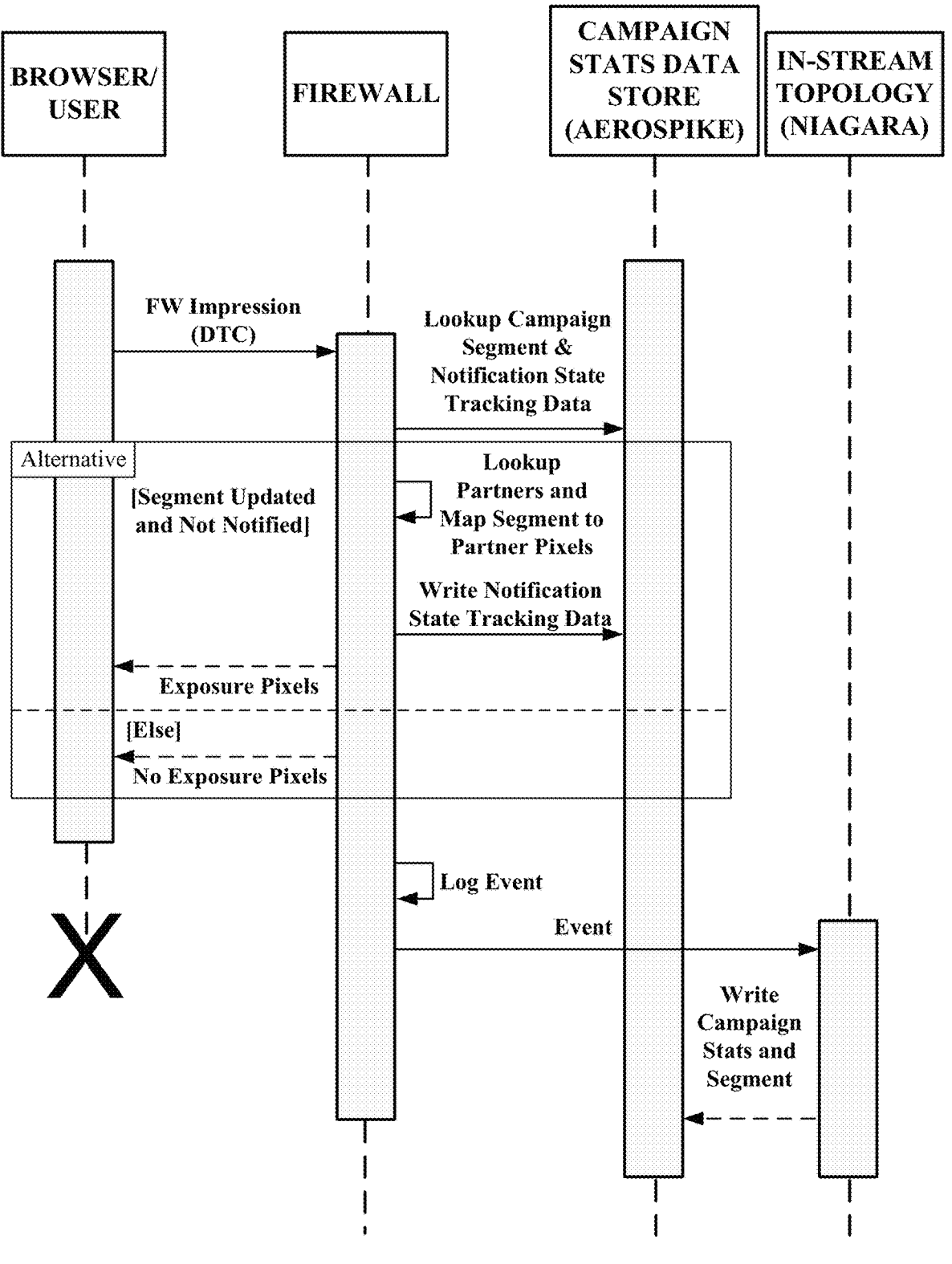
FIG. 12 shows an illustrative flow diagram that illustrates the interactions between various system components to determine whether to continue transmitting media content, such as advertisement impressions, to the content consumer in accordance with some embodiments of the disclosed subject matter.
Figure 13:
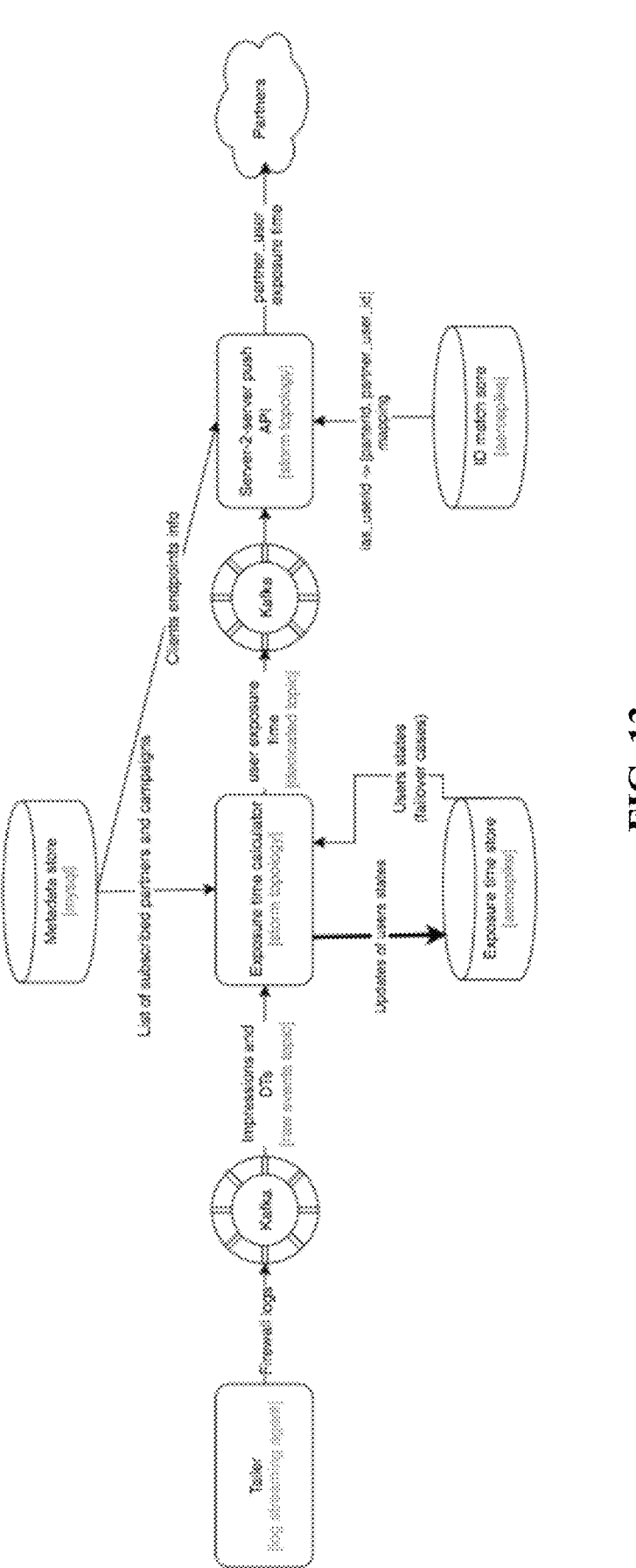
FIG. 13 shows an illustrative system diagram for calculating exposure time in accordance with some embodiments of the disclosed subject matter.

FIGS. 11-13 show an illustrative example of the systems used to implement the mechanisms described herein. For example, FIG. 11 shows a general schematic diagram that illustrates the interactions between various system components to determine whether to continue transmitting media content, such as advertisement impressions, to the content consumer in accordance with some embodiments of the disclosed subject matter. Moreover, the system of FIG. 11 shows the transmission of various advertisement tags or pixels that can be used to implement the mechanisms described herein. For example, the mechanisms can map segments to content partner pixels, retrieve particular database entries relating to the content consumer and/or the campaign for a given impression (e.g., campaign segment, campaign segment timestamp information, and a partner notification timestamp), determine whether the segment has changed, determine whether content partners are to receive a notification, and record a segment notification state. In another example, FIG. 12 shows an illustrative transactional flow between a browser application executing on a user device, a firewall system that receives intercepted or redirected advertisement calls, a data storage system of campaign statistical information that receives requests for campaign segment and notification state information from the firewall system, and a system that calculates exposure time (e.g., per user, per campaign, etc.), calculates user segments (e.g., an underexposed segment versus an overexposed segment having exposure frequency values and exposure time values), and transmits the campaign statistical information and segment information to the data storage system.

In some embodiments, FIGS. 11 and 12 show that an advertisement request can be redirected, intercepted, or otherwise transmitted from a user device to a firewall system. In response to receiving the redirected advertisement request, the firewall system can lookup campaign segment and notification state tracking data.

In some embodiments, as shown in FIGS. 11 and 12, the firewall system can lookup partners and map the segment to partner pixels. For example, the firewall system can receive partner campaign subscriptions and/or segment pixel mappings from a partner metadata store. In some embodiments, the firewall system can also transmit event information and DisplayTime log records to a corresponding system that determines whether to update statistics and/or write a segment associated with the user device for storage in the campaign statistics data store.

In some embodiments, as shown in FIGS. 11 and 12, the firewall system can read at least three bin map entries from the data store for the user or campaign on impression (e.g., campaign_segment, campaign_segment_timestamp, and campaign_notified_timestamp). In response to reading the bin map entries, the firewall system can determine if the segment has changed. In response to determining that the segment has changed, a notification can be sent the partner device. Additionally or alternatively, in response to determining that the segment has changed, the firewall system can transmit an instruction to drop the partner pixel as shown in FIG. 11.

An illustrative notification state tracking and pixel drop code can be represented by:

```
user_record = read_record_by_user_id(some_user_id)
segment = get_current_segment_from(user_record)
```

-continued

```
segment_timestamp = get_segment_timestamp_from(user_record)
notified_segment = get_notified_timestamp_from(user_record)
if (segment not blank AND (notified_timestamp is blank
OR segment_timestamp >
notified_timestamp)) then
write_notified_timestamp(segment_timestamp)
drop pixels( )
end
```

In some embodiments, historical viewability information can be extracted from a campaign statistics data store. For example, as shown in FIG. 12, a code executing on browser application can transmit event information that includes content information, exposure time information, and frequency information, etc. Such event information can be aggregated based on user account information, device information, etc. In another example, as shown in FIG. 11, a firewall system that intercepts advertisement requests can collect event information from the code executing on the browser application for storage on a campaign statistics data store or a system that collects event information or log information and generates campaign statistical information for storage on the campaign statistics data store. In a more particular example, this can include collecting initial and DisplayTime calls from one or more firewall servers.

Based on the impression information, the firewall system or any other suitable component can calculate exposure time per user or exposure time per campaign based on number of content items provided to a user device, a number of viewable content items provided to a user device, and a total exposure time associated with a user device.

Based on the determined exposure information, the firewall system or any other suitable component can determine a user segment for the user device from multiple user segments. In some embodiments, the firewall system can update a data store with updated exposure time information. In some embodiments, the firewall system can transmit user exposure statistics or user segment information to partner devices at a particular time (e.g., every X seconds).

Turning to the exposure time calculator in FIG. 13, an exposure time calculator can filter, from the firewall system logs, impressions and DisplayTime information that are related to subscribed partners. As shown in FIG. 13, this can include retrieving a list of subscribed partners and campaigns from a suitable metadata store.

In some embodiments, the exposure time calculator of FIG. 13 can calculate user exposure time based on any suitable impression information. In one example, starting from an initial event, the exposure time calculator can determine user exposure time based on a number of impressions provided to a user device. In another example, the exposure time calculator can determine user exposure time based on a number of viewable impressions that is incremented in response to detecting that an impression was viewable (e.g., based on a dt ping1, ping5, ping 15). It should be noted that the exposure time calculator can detect that an impression was viewable and increment the number of viewable impressions in response to any suitable information, such as in response to receiving a dt ping1, ping5, ping 15, and unload call.

In some embodiments, user exposure statistics can be aggregated based on any suitable time interval. For example, user exposure statistics can be generated for the last 1 minute, the last ten minutes, the last hour, the last day, the last fourteen days, etc.

In some embodiments, the exposure time calculator of FIG. 13 can request updates of user states from an exposure time store. In response to determining that the user exposure statistics have changed, the exposure time calculator of FIG. 13 can determine which partner devices should receive the updated user exposure statistics. This can include, for example, generating partner-specific payloads having particular data formats, update frequencies, size, etc.

In some embodiments, it should be noted that content providers, such as advertiser, can be enabled to optimize exposure across users and campaigns to drive causal lift in brand affinity and/or conversions for their campaigns. This can be done by, for example, tracking user exposure, the frequency and time a user is exposed to viewable impressions, in real-time on a campaign-by-campaign basis. Observed changes to user exposure can be translated to pre-defined audience segments and communicated to partner systems (such as DSPs) on a user or campaign basis. In order to communicating these segments, the firewall system described above in connection with FIG. 11 can perform a cookie syncing with each partner device.

It should be noted that, in some embodiments, multiple segments that each correspond to increasing levels of frequency (X) and time (Y) can be defined. Segments with increasing frequency (X) and time (Y) can correspond to a signal to target and bid on a user with increasing priority as the user device gets closer to the exposure range that provides optimal lift. The final segment of the multiple segments corresponds to a signal to stop transmitting media content or impressions to the user as additional impressions generally do not generate meaningful incremental lift.

For example, FIG. 11 shows that a user device that is executing a browser application can transmit a segment pixel to a partner device. In a more particular example, the browser application executing on the user device can fire pixels only on subscribed campaign impressions and only segment pixels for the campaign the impression is associated with. In another more particular example, a partner device can provide a cookie sync pixel that contains a request parameter (which is set to the redirect URL) and a cookie macro that the partner device sets to a corresponding cookie value prior to redirecting. The cookie can, in some embodiments, contain a partner identifier and an authentication token. Upon receiving a cookie sync request, the partner device issues a 302 redirect call back to the firewall system or any other suitable system with the cookie value for the user.

In some embodiments, the mechanisms can support a bidirectional sync. For example, given a particular pixel code, a request parameter for a redirect URL, a parameter name (uid), and a partner macro ([UID]), a representative pixel that is fired can be represented by: http://partner.com/cookiesync?uid=xxx&redir_url=http://sc.iasds01.com/sc?partner_id=xxx& partner_uid=[UID]&auth=xxx.

In some embodiments, the mechanisms can support a unidirectional sync. For example, given a particular pixel code and a partner macro ($UID), a representative pixel that is fired can be represented by http://ib.adnx.com/getu-id?http://iasds01.com/sc?&partner_id=xxx&partner_uid=SUID& auth=xxx.

In some embodiments, the mechanisms can aggregate user exposure for pre-defined time periods and then translate them to a set of audience targeting segments. As shown in FIG. 11, when a user segment changes, a segment update request can be created that sends the user segment changes to the partner for the specified campaign.

Figure 14:
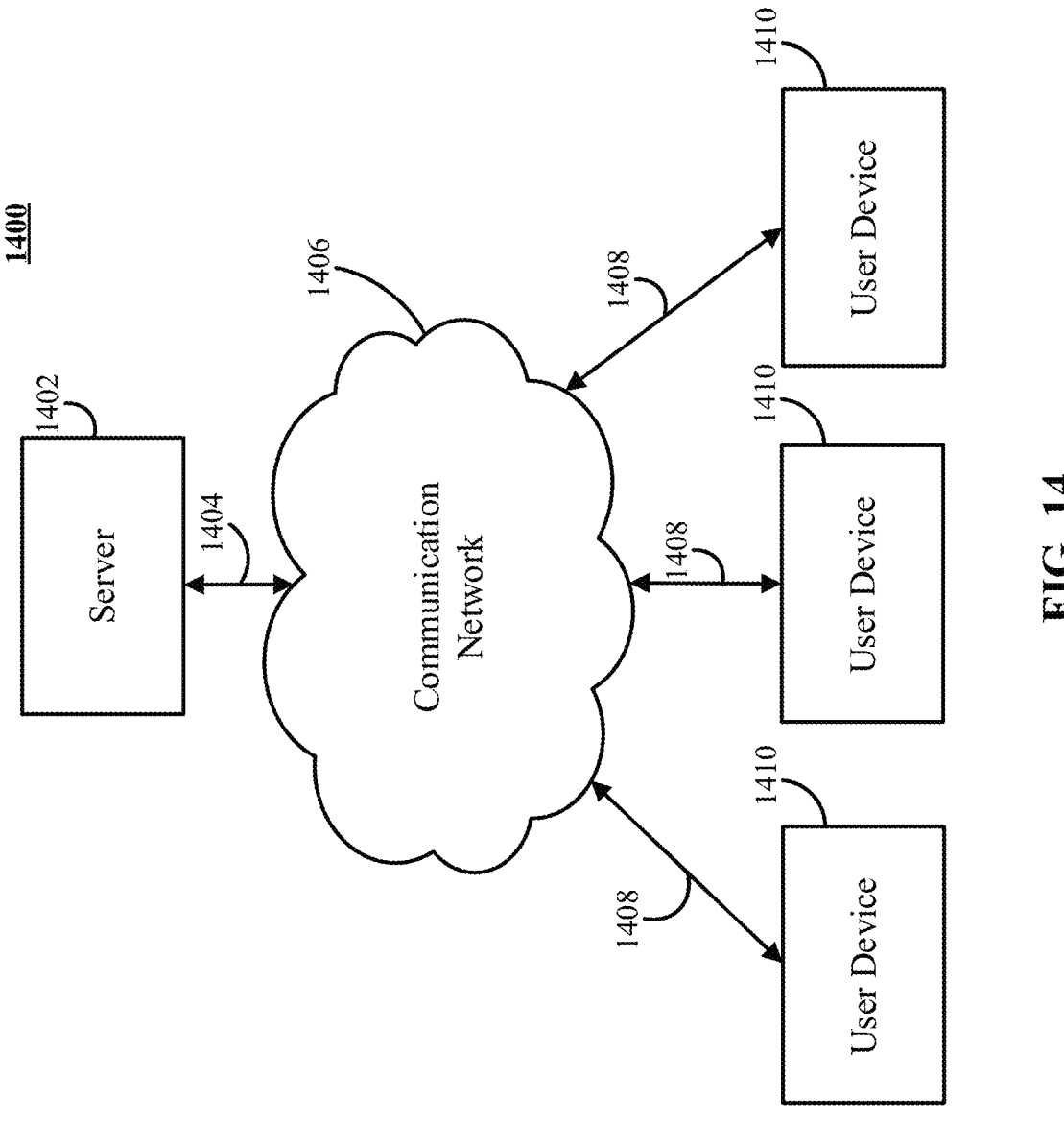
FIG. 14 shows a schematic diagram of an illustrative system suitable for implementation of the mechanisms described herein for inhibiting the transmission of media content based on frequency and/or exposure measurements in accordance with some embodiments of the disclosed subject matter.

FIG. 14 shows an example 1400 of a generalized schematic diagram of a system on which the mechanisms for inhibiting the transmission of media content based on frequency and exposure measurements as described herein can be implemented in accordance with some embodiments of the disclosed subject matter. As illustrated, system 1400 can include one or more user devices 1410. User devices 1410 can be local to each other or remote from each other. User devices 1410 can be connected by one or more communications links 1408 to a communication network 1406 that can be linked to a server 1402 via a communications link 1404.

System 1400 can include one or more servers 1402. Server 1402 can be any suitable server or servers for providing access to the mechanisms described herein for inhibiting the transmission of media content based on frequency and exposure measurements, such as a processor, a computer, a data processing device, or any suitable combination of such devices. For example, the mechanisms for inhibiting the transmission of media content based on frequency and exposure measurements are provided can be distributed into multiple backend components and multiple frontend components and/or user interfaces. In a more particular example, backend components, such as mechanisms for receiving partner subscription information, receiving segment pixel mappings, calculating exposure time, calculating frequency, determining threshold exposure time and threshold frequency based on lift measurements, receiving segment information, determining whether to update segment information, transmitting notifications regarding updated segment information, etc., can be performed on one or more servers 1402. In another more particular example, frontend components, such as presentation of a user interface for providing segment pixels, providing pixel information, placing advertisement tags on a given webpage, providing pixel mappings, initiating the mechanisms for inhibiting the transmission of media content based on frequency and exposure measurements, etc., can be performed on one or more user devices 1410.

In some embodiments, each of user devices 1410, and server 1402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 1410 can be implemented as a personal computer, a laptop computer, a smartphone, a tablet computer, a mobile telephone, a wearable computer, any other suitable computing device, or any suitable combination thereof.

Communications network 1406 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 1404 and 1408 can be any communications links suitable for communicating data among user devices 1410 and server 1402, such as network links, dial-up links, wireless links, hard-wired links, any other suitable communications links, or any suitable combination of such links. Note that, in some embodiments, multiple servers 1402 can be used to provide access to different mechanisms associated with the mechanisms described herein for dynamically detecting mobile environment information.

Figure 15:
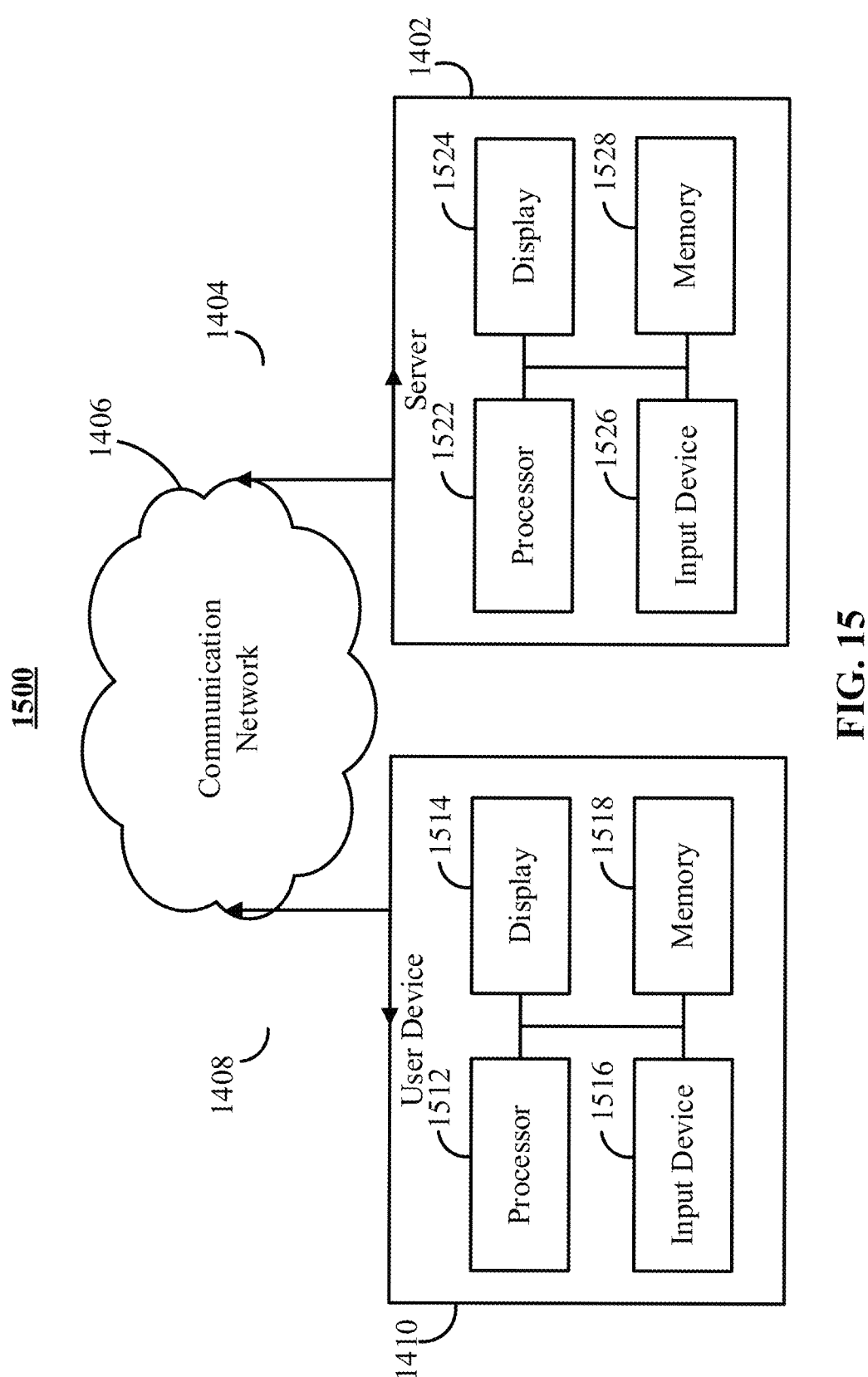
FIG. 15 shows a detailed example of hardware that can be used in a server and/or a user device of FIG. 14 in accordance with some embodiments of the disclosed subject matter.

FIG. 15 shows an example 1500 of hardware that can be used to implement one or more of user devices 1410, and servers 1402 depicted in FIG. 14 in accordance with some embodiments of the disclosed subject matter. Referring to FIG. 15, user device 1410 can include a hardware processor 1512, a display 1514, an input device 1516, and memory 1518, which can be interconnected. In some embodiments, memory 1518 can include a storage device (such as a non-transitory computer-readable medium) for storing a computer program for controlling hardware processor 1512.

Hardware processor 1512 can use the computer program to execute the mechanisms described herein for receiving impression information, receiving segment pixel mappings, and/or for performing any other suitable task associated with the mechanisms described herein. In some embodiments, hardware processor 1512 can send and receive data through communications link 1408 or any other communication links using, for example, a transmitter, a receiver, a transmitter/receiver, a transceiver, or any other suitable communication device. Display 1514 can include a touchscreen, a flat panel display, a cathode ray tube display, a projector, a speaker or speakers, and/or any other suitable display and/or presentation devices. Input device 1516 can be a computer keyboard, a computer mouse, a touchpad, a voice recognition circuit, a touchscreen, and/or any other suitable input device.

Server 1402 can include a hardware processor 1522, a display 1524, an input device 1526, and memory 1528, which can be interconnected. In some embodiments, memory 1528 can include a storage device (such as a non-transitory computer-readable medium) for storing data received through communications link 1404 or through other links. The storage device can further include a server program for controlling hardware processor 1522. In some embodiments, memory 1528 can include information stored as a result of user activity (e.g., user instructions to specify one or more advertising management techniques for particular advertising placements, etc.), and hardware processor 1522 can receive information about advertising placements from user devices 1410. In some embodiments, the server program can cause hardware processor 1522 to, for example, determine threshold exposure frequency and threshold exposure time, determine whether to transmit additional media content items for consumption by the viewer, determine whether to increase impression purchases for the viewer, determining whether to take no further action with regard to the viewer, determine whether to inhibit the transmission of additional media content items to the viewer, and/or for perform any other suitable task associated with the mechanisms described herein.

In a more particular example, hardware processor 1522 can use the computer program to execute the mechanisms described herein for receiving consumption information of a plurality of content items associated with a plurality of viewers; determining, from the consumption information, exposure frequency for each viewer of the plurality of viewers, exposure time of a set of content items provided to each viewer of the plurality of viewers, and lift for each viewer of the plurality of viewers, wherein the lift corresponds to a difference of an expected number of treated conversions and an expected number of untreated conversions over a sum of the expected number of treated conversions and the expected number of untreated conversions; determining an optimal exposure frequency and an optimal exposure time based on the exposure frequency, the exposure time, and the lift; generating (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers; receiving a request for a content item from a user device; determining whether the user device should be assigned with the first user segment, the second user segment, or the third user segment; in response to determining that the user device should be assigned to the first user segment, transmitting the plurality of additional content items until determining that the user device should be assigned to the second user segment based on updated exposure frequency information and updated exposure time information; continuing to transmit the at least one additional content item to the user device while the user device is positioned within the second user segment until determining that the user device should be assigned to the third user segment based on the updated exposure frequency information and the updated exposure time information; inhibiting the presentation of any additional content items on the user device in response to the user device being positioned within the third user segment; sending and receiving data through communications link 1408; and/or for performing any other suitable task associated with the mechanisms described herein.

Hardware processor 1522 can use the server program to communicate with user devices 1410 as well as provide access to and/or copies of the mechanisms described herein. It should also be noted that data received through communications link 1404 or any other communications links can be received from any suitable source. In some embodiments, hardware processor 1522 can send and receive data through communications link 104 or any other communications links using, for example, a transmitter, a receiver, a transmitter/receiver, a transceiver, or any other suitable communication device. In some embodiments, hardware processor 1522 can receive commands and/or values transmitted by one or more user devices 1410 and/or one or more users of server 1402. Display 1524 can include a touchscreen, a flat panel display, a cathode ray tube display, a projector, a speaker or speakers, and/or any other suitable display and/or presentation devices. Input device 426 can be a computer keyboard, a computer mouse, a touchpad, a voice recognition circuit, a touchscreen, and/or any other suitable input device.

In some embodiments, server 1402 can be implemented in one server or can be distributed as any suitable number of servers. For example, multiple servers 1402 can be implemented in various locations to increase reliability and/or increase the speed at which the server can communicate with user devices 1410. Additionally or alternatively, as described above in connection with FIG. 14, multiple servers 1402 can be implemented to perform different tasks associated with the mechanisms described herein.

It should be understood that the mechanisms described herein can, in some embodiments, include server-side software, server-side hardware, client-side software, client-side hardware, or any suitable combination thereof. For example, the mechanisms described herein can encompass a computer program written in a programming language recognizable by server 1402 and/or by user device 1410 (e.g., a program written in a programming language, such as, Java, C, Objective-C, C++, C#, JavaScript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps can be executed or performed in any order or sequence not limited to the order and sequence shown and described in the figures. Also, some of the above steps can be executed or performed substantially simultaneously where appropriate or in parallel to reduce latency and processing times. It should also be noted that, as used herein, the term mechanism can encompass hardware, software, firmware, or any suitable combination thereof.

Accordingly, methods, systems, and media for inhibiting the transmission of media content based on frequency and exposure measurements are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for presenting content, the method comprising:

receiving, using a hardware processor of a server device, consumption information of a plurality of content items associated with a plurality of viewers, wherein each of the plurality of content items is associated with browser code that transmits the consumption information associated with a browser application to the server device;

determining, using the hardware processor, from the consumption information, an exposure frequency for each viewer of the plurality of viewers, an exposure time of at least a subset of the plurality of content items provided to each viewer of the plurality of viewers, and a lift for each viewer of the plurality of viewers;

receiving, using the hardware processor, from a user device, a cookie sync pixel that includes a request parameter that is set to a redirection URL associated with the server device and a cookie macro to a corresponding cookie value prior to redirection to the server device using the redirection URL;

transmitting, using the hardware processor, a cookie sync request to the user device that redirects the corresponding cookie value to the server device;

generating, using the hardware processor, based on the cookie sync request, a first heatmap that shows a distribution of the plurality of viewers in bins of exposure frequencies and exposure times to determine a threshold exposure frequency and a threshold exposure time to achieve an optimal lift based on the exposure frequency, the exposure time, and the lift; and automatically determining, using the hardware processor, whether a content provider should present a content item to the user device based on the generated first heatmap.

2. The method of claim 1, wherein the method further comprises:

generating (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers in which the exposure frequency is greater than the threshold exposure frequency and in which the exposure time is greater than the threshold exposure time, wherein at least one of the first user segment, the second user segment, and the third user segment is mapped to a content partner tag; and automatically determining whether a content provider should present the content item to the user device based on whether the user device is associated with a segment notification state corresponding to one of the first user segment, the second user segment, or the third user segment for the content item in the first request and based on a determination that a current user segment should be updated to a different user segment.

3. The method of claim 2, wherein, in response to determining that the segment notification state indicates that the user device should be assigned to the first user segment for the content item in the first request, the segment notification state causes the plurality of additional content items to be transmitted to the user device until determining that the user device should be assigned to the second user segment based on updated exposure frequency information and updated exposure time information.

4. The method of claim 2, wherein, in response to receiving a second redirected request for the content item and determining that the segment notification state indicates that the user should be updated from the first user segment to the second user segment, the segment notification state causes the at least one additional content item to be transmitted to the user device while the user device is positioned within the second user segment until determining that the user device should be assigned to the third user segment based on the updated exposure frequency information and the updated exposure time information.

5. The method of claim 2, wherein, in response to receiving a third redirected request for the content item and determining that the segment notification state indicates that the user should be updated from the second user segment to the third user segment, the segment notification state causes the presentation of any additional content items to be automatically inhibited, without user intervention, on the user device by updating the mapping of the third user segment to the content partner tag and dropping the content partner tag.

6. The method of claim 2, further comprising generating a frequency-exposure graphical representation, wherein each portion of the frequency-exposure graphical representation is assigned a color code associated with a lift measurement corresponding to a combination of a particular exposure frequency and a particular exposure time.

7. The method of claim 6, wherein the threshold exposure frequency and the threshold exposure time are determined based on the color code associated with the lift measurement.

8. The method of claim 6, wherein each of the first user segment, the second user segment, and the third user segment is assigned to a region of the frequency-exposure graphical representation, wherein the region is a two-dimensional area within the frequency-exposure graphical representation.

9. The method of claim 2, wherein inhibiting the presentation of any additional content items on the user device in response to the user device being positioned within the third user segment further comprises transmitting a drop instruction to the user device in response to the request for the content item.

10. The method of claim 2, wherein inhibiting the presentation of any additional content items on the user device in response to the user device being positioned within the third user segment further comprises determining whether to transmit a notification to devices associated with the content item being requested.

11. A system for presenting content, the system comprising:
a memory; and
a hardware processor that, when executing computer executable instructions stored in the memory, is configured to:
receive consumption information of a plurality of content items associated with a plurality of viewers, wherein each of the plurality of content items is associated with browser code that transmits the consumption information associated with a browser application to the server device;
determine, from the consumption information, an exposure frequency for each viewer of the plurality of viewers, an exposure time of at least a subset of the plurality of content items provided to each viewer of the plurality of viewers, and a lift for each viewer of the plurality of viewers;
receive, from a user device, a cookie sync pixel that includes a request parameter that is set to a redirection URL associated with the server device and a cookie macro to a corresponding cookie value prior to redirection to the server device using the redirection URL;
transmit a cookie sync request to the user device that redirects the corresponding cookie value to the server device;
generate, based on the cookie sync request, a first heatmap that shows a distribution of the plurality of viewers in bins of exposure frequencies and exposure times to determine a threshold exposure frequency and a threshold exposure time to achieve an optimal lift based on the exposure frequency, the exposure time, and the lift; and
automatically determine whether a content provider should present a content item to the user device based on the generated first heatmap.

12. The system of claim 11, wherein the hardware processor is further configured to:

generate (i) a first user segment in which a plurality of additional content items should be provided to a viewer of the plurality of viewers, (ii) a second user segment in which at least one additional content item should be provided to the viewer of the plurality of viewers, and (iii) a third user segment in which no additional content items should be provided to the viewer of the plurality of viewers in which the exposure frequency is greater than the threshold exposure frequency and in which the exposure time is greater than the threshold exposure time, wherein at least one of the first user segment, the second user segment, and the third user segment is mapped to a content partner tag; and
automatically determine whether a content provider should present the content item to the user device based on whether the user device is associated with a segment notification state corresponding to one of the first user segment, the second user segment, or the third user segment for the content item in the first request and based on a determination that a current user segment should be updated to a different user segment.

13. The system of claim 12, wherein, in response to determining that the segment notification state indicates that the user device should be assigned to the first user segment for the content item in the first request, the segment notification state causes the plurality of additional content items to be transmitted to the user device until determining that the user device should be assigned to the second user segment based on updated exposure frequency information and updated exposure time information.

14. The system of claim 12, wherein, in response to receiving a second redirected request for the content item and determining that the segment notification state indicates that the user should be updated from the first user segment to the second user segment, the segment notification state causes the at least one additional content item to be transmitted to the user device while the user device is positioned within the second user segment until determining that the user device should be assigned to the third user segment based on the updated exposure frequency information and the updated exposure time information.

15. The system of claim 12, wherein, in response to receiving a third redirected request for the content item and determining that the segment notification state indicates that the user should be updated from the second user segment to the third user segment, the segment notification state causes the presentation of any additional content items to be automatically inhibited, without user intervention, on the user device by updating the mapping of the third user segment to the content partner tag and dropping the content partner tag.

16. The system of claim 12, wherein the hardware processor is further configured to generate a frequency-exposure graphical representation, wherein each portion of the frequency-exposure graphical representation is assigned a color code associated with a lift measurement corresponding to a combination of a particular exposure frequency and a particular exposure time.

17. The system of claim 16, wherein the threshold exposure frequency and the threshold exposure time are determined based on the color code associated with the lift measurement.

18. The system of claim 16, wherein each of the first user segment, the second user segment, and the third user segment is assigned to a region of the frequency-exposure graphical representation, wherein the region is a two-dimensional area within the frequency-exposure graphical representation.

19. The system of claim 12, wherein inhibiting the presentation of any additional content items on the user device in response to the user device being positioned within the third user segment further comprises transmitting a drop instruction to the user device in response to the request for the content item.

20. The system of claim 12, wherein inhibiting the presentation of any additional content items on the user device in response to the user device being positioned within the third user segment further comprises determining whether to transmit a notification to devices associated with the content item being requested.

21. A non-transitory computer-readable medium containing computer-executable instructions that, when executed by a hardware processor, cause the hardware processor to perform a method for presenting content, the method comprising:

receiving consumption information of a plurality of content items associated with a plurality of viewers, wherein each of the plurality of content items is associated with browser code that transmits the consumption information associated with a browser application to a server device;

determining, from the consumption information, an exposure frequency for each viewer of the plurality of viewers, an exposure time of at least a subset of the plurality of content items provided to each viewer of the plurality of viewers, and a lift for each viewer of the plurality of viewers;

receiving, from a user device on which the browser application is executing, a cookie sync pixel that includes a request parameter that is set to a redirection URL associated with a server device and a cookie macro to a corresponding cookie value prior to redirection to the server device using the redirection URL;

transmitting a cookie sync request to the user device that redirects the corresponding cookie value to the server device;

generating, based on the cookie sync request, a first heatmap that shows a distribution of the plurality of viewers in bins of exposure frequencies and exposure times to determine a threshold exposure frequency and a threshold exposure time to achieve an optimal lift based on the exposure frequency, the exposure time, and the lift; and automatically determining whether a content provider should present a content item to the user device based on the generated first heatmap.

\* \* \* \* \*